United States Patent [19]

Dawson

[11] Patent Number: 5,913,790
[45] Date of Patent: Jun. 22, 1999

[54] PLANTABLE RETAINING WALL BLOCK

[75] Inventor: William B. Dawson, Maple Grove, Minn.

[73] Assignee: Keystone Retaining Wall Systems, Inc., Bloomington, Minn.

[21] Appl. No.: 08/806,485

[22] Filed: Feb. 27, 1997

Related U.S. Application Data

[63] Continuation of application No. 08/475,199, Jun. 7, 1995.

[51] Int. Cl.⁶ .............................. E04C 1/39; A01G 9/02
[52] U.S. Cl. .................................. 52/609; 47/83; 47/86; 52/604; 52/606; 405/286
[58] Field of Search .......................... 52/604, 606, 607, 52/609, 611; 47/83, 86, 87; 405/284, 286

[56] References Cited

U.S. PATENT DOCUMENTS

| | | |
|---|---|---|
| D. 184,747 | 3/1959 | Livesay, Jr. . |
| D. 210,876 | 4/1968 | Kocher . |
| D. 244,201 | 5/1977 | Muse . |
| D. 250,484 | 12/1978 | Muse . |
| D. 343,461 | 1/1994 | Powell . |
| 750,790 | 2/1904 | Anderson ................................ 52/607 |
| 2,513,711 | 7/1950 | Cain . |
| 2,514,536 | 7/1950 | Burney . |
| 3,389,499 | 6/1968 | Haile . |
| 3,418,774 | 12/1968 | Kocher et al. . |
| 4,123,881 | 11/1978 | Muse ....................................... 52/100 |
| 4,229,123 | 10/1980 | Heinzmann . |
| 4,379,659 | 4/1983 | Steiner . |
| 4,521,138 | 6/1985 | Steiner . |
| 4,524,551 | 6/1985 | Scheiwiller . |
| 4,658,541 | 4/1987 | Haile . |
| 4,671,706 | 6/1987 | Giardini . |
| 4,711,606 | 12/1987 | Leling et al. . |
| 4,884,920 | 12/1989 | Perazzi . |
| 4,896,999 | 1/1990 | Ruckstuhl . |
| 4,920,712 | 5/1990 | Dean, Jr. . |
| 4,964,761 | 10/1990 | Rossi . |
| 5,044,834 | 9/1991 | Janopaul, Jr. . |
| 5,072,566 | 12/1991 | Zeidman . |
| 5,108,231 | 4/1992 | Rausch . |
| 5,161,918 | 11/1992 | Hodel . |
| 5,177,925 | 1/1993 | Winkler et al. . |
| 5,214,898 | 6/1993 | Beretta . |
| 5,257,880 | 11/1993 | Janopaul, Jr. . |
| 5,341,618 | 8/1994 | Schaaf et al. . |

FOREIGN PATENT DOCUMENTS

| | | |
|---|---|---|
| 322667 | 7/1989 | European Pat. Off. . |
| 2561684 | 9/1985 | France . |
| 0362110 | 9/1988 | France . |
| 2613396 | 10/1988 | France . |
| 2622226 | 4/1989 | France . |
| 3317633 | 11/1984 | Germany . |
| 3510914 | 10/1986 | Germany . |
| 3809549 | 10/1989 | Germany . |
| 0569323 | 11/1993 | Germany . |
| 325123 | 2/1991 | Japan . |
| 6116973 | 4/1994 | Japan . |
| 2151287 | 7/1985 | United Kingdom . |
| 9408097 | 4/1994 | WIPO . |
| 9417253 | 8/1994 | WIPO . |

*Primary Examiner*—Michael Safavi
*Attorney, Agent, or Firm*—Popovich & Wiles, P.A.

[57] ABSTRACT

A plantable retaining wall block having a plant-receiving cavity located in a top surface thereof. The block is constructed so that the plant-receiving cavity lies between portions of side walls which are generally parallel with a front face of the block. The shape of the block is such that a nearly vertical retaining wall may be constructed such that each plant-receiving cavity is substantially exposed to allow vegetation to be planted. The wall block may include a connection member or an alignment member to allow the block to be stabilized and aligned with blocks in adjacent rows of a retaining wall.

15 Claims, 12 Drawing Sheets

PLANTABLE RETAINING WALL BLOCK

This is a continuation of application Ser. No. 08/475,199 filed Jun. 7, 1995.

FIELD OF THE INVENTION

This invention relates generally to retaining wall blocks and retaining walls constructed from such blocks. More particularly, the invention is directed to a retaining wall block having a plant receiving cavity and a plantable retaining wall constructed from the plantable block.

BACKGROUND OF THE INVENTION

Retaining walls for use in various landscaping projects are available in a wide variety of styles. Numerous methods and materials exist for the construction of retaining walls. Such methods include the use of natural stone, poured in place concrete, pre-cast panels, masonry, and landscape timbers or railroad ties.

In recent years, segmental concrete retaining wall units which are dry stacked (i.e., built without the use of mortar) have become a widely accepted product for the construction of retaining walls. An example of such a product is described in U.S. Pat. No. Re. 34,314 issued to Forsberg (Forsberg '314). Such products have gained popularity because they are mass produced and, thus, relatively inexpensive. They are structurally sound, easy and relatively inexpensive to install, and couple the durability of concrete with the attractiveness of various architectural finishes. The retaining wall system described in Forsberg '314 has been particularly successful because of its use of a block design that includes, among other design elements, a unique pinning system that interlocks and aligns the retaining wall units, allowing structural strength and efficient rates of installation. This system is advantageous in the construction of larger walls when combined with the use of geogrids hooked over the pins, as described in U.S. Pat. No. 4,914,876, which issued to Forsberg.

An important consideration in the design of retaining walls is their aesthetic appeal. Retaining walls (especially larger retaining walls) may present a rather monolithic and monotonous appearance. One way of enhancing the visual appearance of a wall is to integrate plantable spaces within the wall which can hold and sustain plant life. On larger walls, providing plantable space within the wall can break up the appearance of monolithic concrete. On smaller walls, such as those used in residential applications, appearance may also be improved by adding plants. Therefore, the ability to integrate plant life into a structurally sound retaining wall offers considerable aesthetic benefits.

Several approaches have been used in the past to construct a retaining wall incorporating plantable space, but each has had shortcomings. One approach has been to construct the wall with standard retaining wall blocks built so that it has one or more terraces. Although terraced walls allow the terraces to be planted, they have several disadvantages. First, the plantable area is confined only to the horizontal terraces. Thus, only limited portions of the wall structure can be enhanced with plantings, which limits design flexibility. Additionally, many wall designers desire to intersperse plantings throughout a wall's surface in order to create a "green" wall, i.e., a wall whose structural members are effectively concealed by the plantings. A second disadvantage of using terraces is that they take more space than a wall without terracing. In certain circumstances, as where a wall runs along or near a property line, or where limited space is available or affordable for other reasons, a terrace may not be feasible. Under any circumstances, the terrace will diminish the amount of usable space on a site and, thus, may lower the site's real estate value. Third, walls built with terraces are more difficult to engineer and to build than are walls without terraces. Particularly where the upper tiers of the wall are located relatively close behind the lower tier or tiers, the upper tiers place additional loads on the lower tier or tiers. Moreover, tiered structures raise global stability issues not present with respect to single walls and are prone to settlement. Finally, on taller walls the terraces may not be accessible and may be difficult or dangerous to maintain to prevent growth of undesired plant life.

A second approach to constructing plantable retaining walls has been to use specialized retaining wall units designed to accommodate planting. This method relies on two principle design features, either singly or in combination, to allow planting to be incorporated within the wall. The first feature is to increase the amount of setback between courses or rows of blocks to allow access to a soil retaining cavity in which plants can be grown. The second is to construct the wall with spaces between horizontally adjacent blocks, which allow the soil behind the wall to be accessed for planting. For purposes of clarity each of these features will be discussed individually.

The first design feature relies on the amount of setback between courses or rows of blocks to allow construction of a plantable wall. The setback of the wall is the amount that the wall leans back into the retained earth. Segmental retaining wall units are commonly designed so that the blocks can readily be installed with a predetermined amount of setback per course. For a non-plantable segmental retaining wall unit, setbacks ranging from zero degrees (i.e., no setback) to approximately 12 degrees are common. With a plantable unit, this setback is generally much greater and can be as much or more than 5½ inches per 8 inch course. The setback is typically combined with the use of a plantable cavity in the blocks. Since the setback from course to course is as much as 5½ inches, ample space in the plantable cavity in each block is exposed to allow for planting. There are, however, numerous disadvantages in relying on setback to allow planting in a retaining wall. The use of setback to allow planting is similar to the use of terraces. The higher the degree of setback, the greater the amount of land area needed to accommodate the retaining wall structure. Additionally, setback retaining walls create both aesthetic and functional problems for the wall especially when curves or corners are built. Because the units are setback, when an outside curve is built, the units will bind as succeeding courses are laid. This necessitates cutting individual blocks to fit. If an inside curve is built the units will gap apart as the wall is built up. Thus, units with significant amounts of setback are truly suitable only for straight walls. Finally, walls with a high degree of setback also raise global stability issues and may be more expensive to build and engineer than walls with less setback.

The second design feature used in constructing plantable segmental retaining walls is to provide horizontal gaps in the wall structure. This is typically accomplished by leaving spaces between the units or blocks of each course. This approach is frequently incorporated along with the use of setback. With or without setback this approach suffers from several defects. Such an approach compromises the retaining wall's structural soundness. Since gaps are left in the structure, the structure is prone to suffer the effects of either gradual or catastrophic events of erosion. The gapping of the units results in point loading on the units, which can cause cracking or other structural weaknesses. In addition, such systems are not suitable for larger structural wall use because the gapping weakens the wall's ability to withstand significant earth pressures. Finally, walls built in this fashion are not as easy to install because the amount of gapping is typically not predetermined by the unit's design and must be adjusted based upon "eye-balling" unit placement, or taking the time to measure the position for each block as it is placed. This may result in haphazard placement of the units or inefficient rates of production in the installation of the wall.

In view of the various disadvantages which exist with respect to the construction of conventional plantable retaining wall units, there is a need for a plantable retaining wall block and retaining wall constructed from the block, both of which overcome these disadvantages. Specifically, it would be desirable to provide a plantable wall block which allows the construction of retaining walls of varying degrees of setback, using one basic retaining wall block, which has alignment means, which allow the wall builder to choose among multiple setback options. It would also be desirable to provide a plantable retaining wall block that integrates effectively with standard non-plantable retaining wall blocks, including matching the degree of setback used by the standard retaining wall blocks and the connection system of the standard blocks.

Accordingly, it is an object of the present invention to provide a retaining wall block that is constructed with a plantable area that is capable of being built into structurally sound, vertical or minimally setback walls while providing adequate space in the wall to insert soil and plant material, and to allow plant growth.

Another object of the present invention is to provide a retaining wall block that is constructed with a plantable area that provides the wall builder with multiple alignment guides to permit the efficient construction of plantable retaining walls with predetermined amounts of setback.

Another object of the present invention is to provide a retaining wall block that is constructed with a plantable area that, when laid in a running pattern, creates horizontal spaces for planting of the course below, without creating any gaps in the retaining wall structure, and which may be laid in a manner which results in the construction of a vertical wall or wall with minimal setback.

Another object of the present invention is to provide a plantable retaining wall block with minimal setback that uses interlocking means that do not require the use of a separate pin or spacing device.

SUMMARY OF THE INVENTION

In accordance with the present invention there is disclosed a plantable retaining wall block. The block has top and bottom surfaces, each of which has a front edge and a rear edge which are spaced apart from each other and are substantially parallel. A front face extends between the front edges of the top and bottom surfaces and has a pair of side edges. A rear face extends between the rear edges of the top and bottom surfaces and has a pair of side edges. A pair of side walls extend between the top and bottom surfaces. One of the side walls extends between one of the side edges of the front and rear faces and the other of the side walls extends between the other of the side edges of the front and rear faces. Each side wall has first, second and third surfaces. The first surface extends from a side edge of the front face towards the rear face until it intersects with the second surface. The second surface extends away from the other side wall to the third surface. The second surface is generally parallel with the front face and perpendicular to the first surface. The third surface extends from the second surface to the rear face. The block includes a plant-receiving cavity formed in the top surface. The third surface of each side wall of the retaining wall block may comprise two or more generally planar surfaces or may lie within a single plane. The plant-receiving cavity may have a bottom wall which is tapered downward as it extends from the front face to the rear face. A drainage opening in flow communication with the plant-receiving cavity is provided.

In one embodiment, the plant-receiving cavity is positioned such that a substantial potion of the cavity lies between the first surfaces of each side wall. The block is constructed so that the length of the front face along a front edge is greater than the sum of the lengths of the second surfaces of each side wall and the sum of the lengths of the front face and the second surfaces of each side wall is equal to the length of the widest distance between the side walls as measured along a line substantially parallel to the front face. Further, the retaining wall block is constructed so that the sum of the lengths of the second surfaces of each side wall is greater than the length of the width of the plant-receiving cavity as measured along a line substantially parallel to the front face. In addition, the sum of the lengths of the second surfaces of each side wall are greater than the width of the plant-receiving cavity as measured along a line substantially parallel to the front face.

In a further embodiment a retaining wall block includes a connection member to allow the block to be connected to blocks in adjacent rows. The connection member may include at least two pins, at least two pin holes for retaining the pins and at least two pin-receiving pockets for receiving pins from adjacent blocks. Further, the connection member may include multiple setback positions to allow selection of multiple setbacks when forming a retaining wall.

In a further embodiment the retaining wall block includes an alignment member to allow the block to be aligned with blocks in adjacent rows of a retaining wall. The alignment member may include multiple setback positions to allow selection of multiple setbacks when forming a retaining wall. The alignment member is positioned such that the block may be aligned with approximately no setback with respect to blocks in adjacent rows of a retaining wall.

BRIEF DESCRIPTION OF THE DRAWINGS

The foregoing and other aspects of the present invention will be best appreciated with reference to the detailed description of the invention, which follows, when read in conjunction with the accompanying drawings wherein.

DETAILED DESCRIPTION OF THE INVENTION

Figure 1:
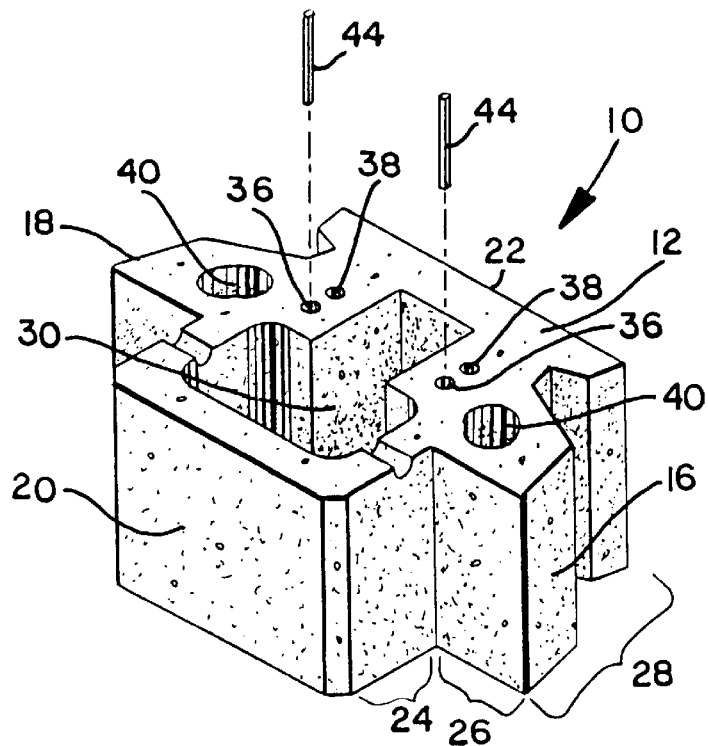
FIG. 1 is a perspective view of a landscaping block in accordance with the present invention.

The plantable retaining wall block of the present invention can be understood generally with reference to FIGS. 1–4. Wall block 10 includes a top surface 12 and a bottom surface 14, each being spaced apart from and substantially parallel to the other. A pair of generally opposed side walls 16 and 18 extend along the sides of the block from top 12 to bottom 14. The block includes a front face 20 and a generally opposed rear face 22, the front face extending between front edges of the top and bottom surfaces and between the side walls, the rear face extending between rear edges of the top and bottom surfaces and the side walls.

Figure 2:
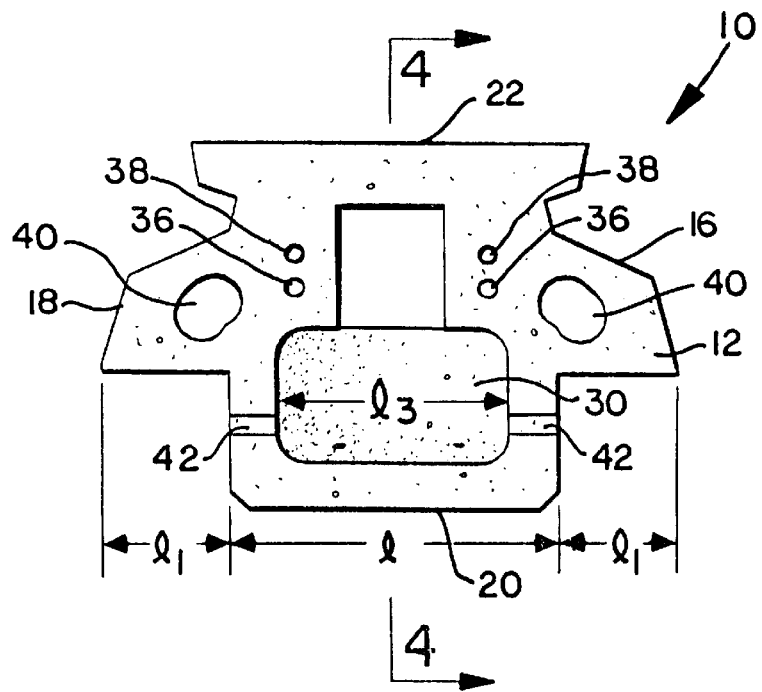
FIG. 2 is a top view of the retaining wall block of FIG. 1.
Figure 1A:
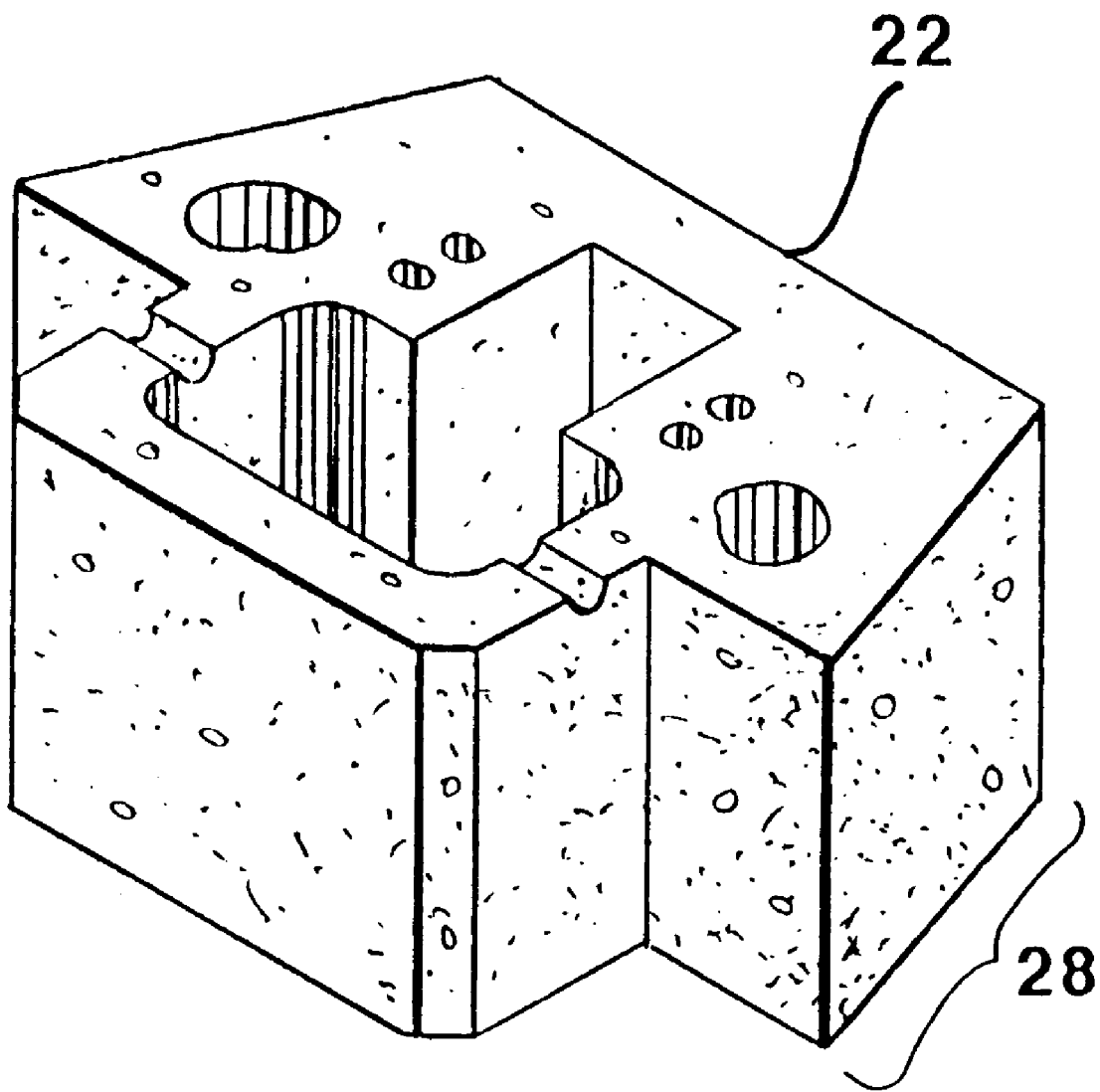
FIG. 1a is a perspective view of an alternate embodiment of the landscaping block of the present invention.
Figure 3:
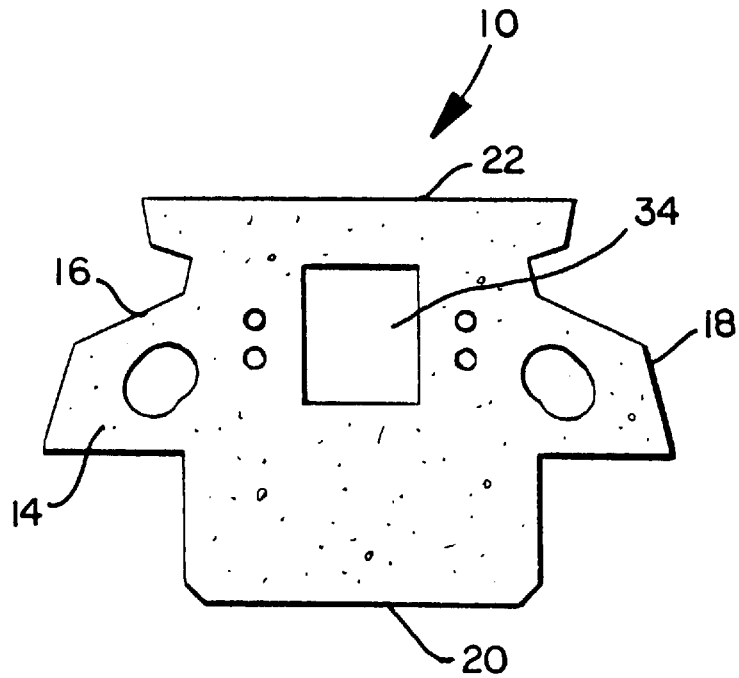
FIG. 3 is a bottom view of the retaining wall block of FIG. 1.
Figure 4:
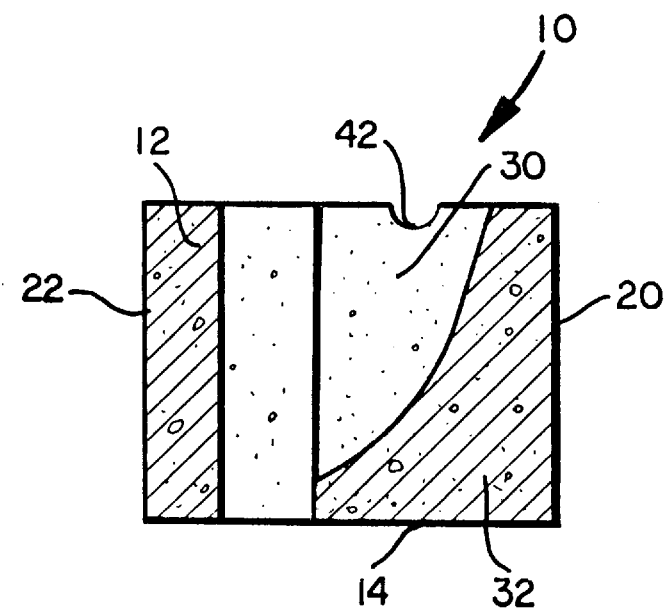
FIG. 4 is a cross-sectional view of the retaining wall block of FIG. 2 taken along line 4—4.

Side walls 16 and 18 are preferably symmetrical and comprised of at least three generally planar surfaces, each of which extends from a side edge of the top surface to the bottom surface. A first surface 24 extends from a side edge of front face 20 towards rear face 22. Preferably, first surface 24 is approximately perpendicular to front face 20. First surface 24 intersects second surface 26. Second surface 26 extends outwardly in a direction away from the opposing side wall and is preferably generally perpendicular to first surface 24 and generally parallel to front face 20. Second surface 26 intersects a third surface 28 which extends between second surface 26 and rear face 22. Third surface 28 may comprise a multi-planar configuration as shown in FIGS. 1–3. Alternatively, third surface 28 may lie within a single plane which may be generally perpendicular to rear face 22, may form an acute angle with rear face 22, or may form an obtuse angle with rear face 22. It will be appreciated that the intersections of the various surfaces of the retaining wall block 10 may be sharp, flattened, rounded, or beveled.

Retaining wall block 10 includes a plant receiving cavity 30. Plant receiving cavity 30 is formed in top surface 12 and extends toward bottom surface 14. Plant receiving cavity 30 is of sufficient volume to receive an adequate amount of soil to enable plant and other vegetation to be grown. A bottom wall 32 is provided to contain the soil within the plant receiving cavity. Although bottom wall 32 may be configured in any manner which contains the soil, it has been found to be advantageous to slope the wall downwardly from the front face and top surface towards the rear face. Such a configuration facilitates construction of the block and increases its strength. An additional hole 34 extends from the rear surface of plant receiving cavity 30 towards rear face 22. Hole 34 provides a drainage outlet for plant receiving cavity 30.

Notches 42 may be provided on either side of plant receiving cavity 30. Notches 42 accommodate an irrigation pipe or hose so that the vegetation in plant receiving cavities 30 may be watered.

Plant receiving cavity 30 is shaped and positioned towards the front face 20 of the block so that a significant amount of the cavity is located in the front portion of the block. Preferably, a substantial portion of the surface opening of the cavity is located between opposing first side wall surfaces 24. In other words, the cavity is located such that a substantial portion of it would lie to the front face side of a plane extending between second surfaces 26 of the block. Preferably, the block is constructed so that the length l of the front face 20 along a front edge is greater than the sum of the lengths $(l_1+l_1)$ of the second surfaces of each side wall 26 and wherein the sum of the lengths of the front face and the second surfaces $(l+l_1+l_1)$ is equal to the length of the widest distance between the side walls as measured along a line substantially parallel to the front face. Additionally, the block will preferably be constructed so that the sum of the lengths of the second surfaces 26 of each side wall $(l_1+l_1)$ is greater than the width $l_3$ of the plant receiving cavity 30 as measured along a line substantially parallel to the front face. By constructing the block in accordance with these dimensions a substantial portion of the plant receiving cavity is exposed when the blocks are assembled to form a vertical wall.

In order to form a plantable retaining wall the blocks are laid side by side in courses. Each layer (course) is offset by about one-half the width of a block so that the blocks are laid in what is commonly referred to as a running bond pattern. For walls having only a few courses, each layer may be held to the next by the friction between blocks. For taller walls where the forces against the wall are greater, the retaining wall block 10 preferably includes a connection element to allow connection of the block to adjacent blocks above and below in the retaining wall in a manner which stabilizes the blocks with respect to one another. The connection system also functions as an alignment mechanism allowing precise alignment of the blocks with respect to one another. This is an important feature even in shorter walls where stability is not a large concern. In the embodiment disclosed in FIGS. 1–4, the connection element includes a pair of front pin holes 36, a pair of rear pin holes 38 and a pair of pin pockets 40 located symmetrically on each side of top surface 12 of the block. Similar pin connection systems are known in the art. See, for example, the Forsberg '314 patent which is assigned to the assignee of the present invention. The connection system allows the retaining wall to be constructed with multiple setback positions.

Figure 5:
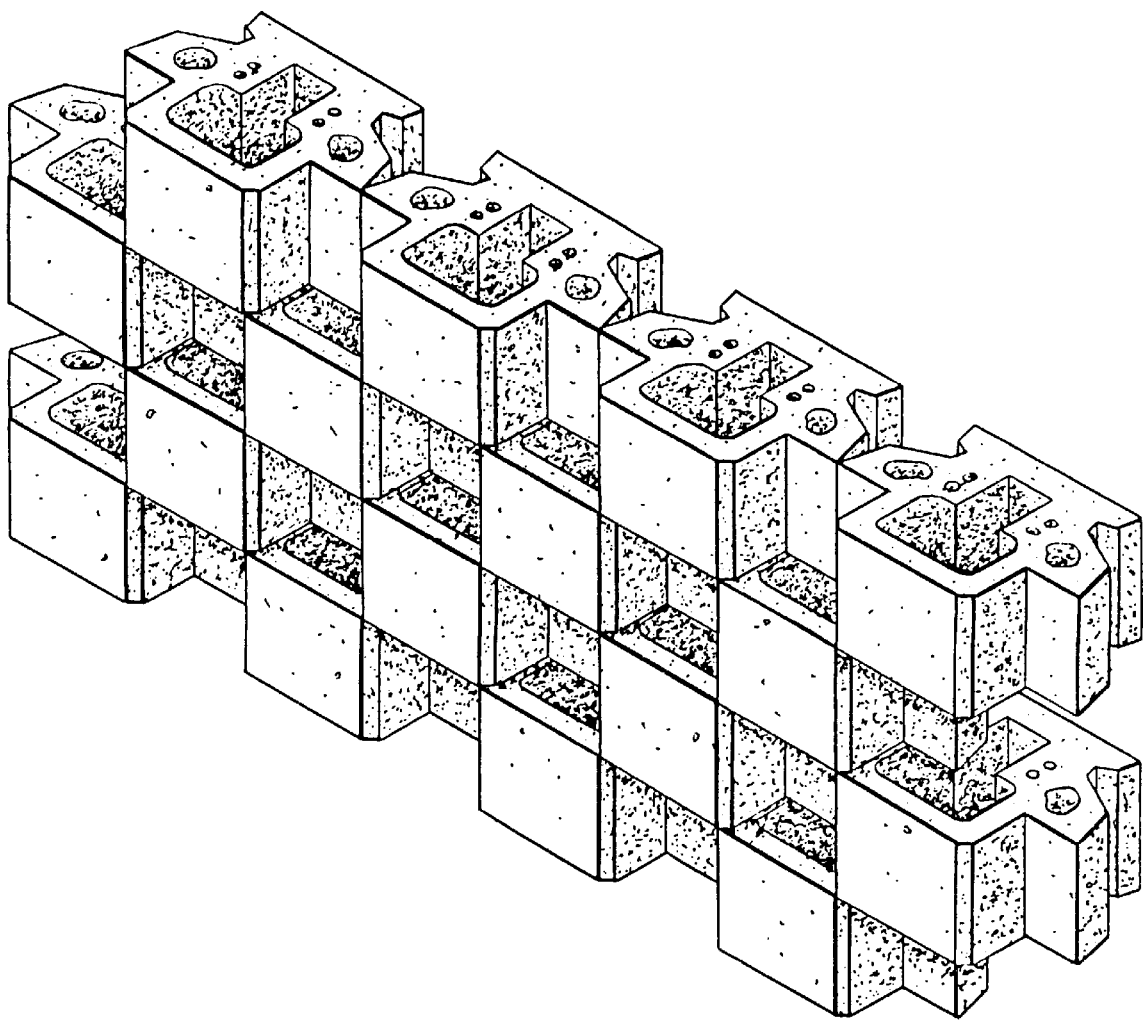
FIG. 5 is a perspective view of a portion of a retaining wall constructed with the retaining wall block of FIG. 1 with the block connection elements set at a first substantially vertical position.

For a vertical wall with minimal setback the wall is constructed with pins 44 in the front pin holes 36 (as shown in FIG. 1). Each block in the first course of blocks of the wall has a pin inserted in the front pin hole on each side of the block. The next course of blocks is laid so that the pin receiving pockets 40 on the bottom surface of the next layer of blocks is positioned over the pins extending from adjacent blocks so that the pin pocket 40 on one side of the block receives a pin from a first block and the pin receiving pocket 40 on the other side of the block receives a pin from the next adjacent block in an overlapped manner. The block just laid is slid to the front so that the pins are positioned against a rear surface of the pin receiving pockets. A portion of a wall constructed with pins in the front pin hole is shown in FIG. 5.

Figure 6:
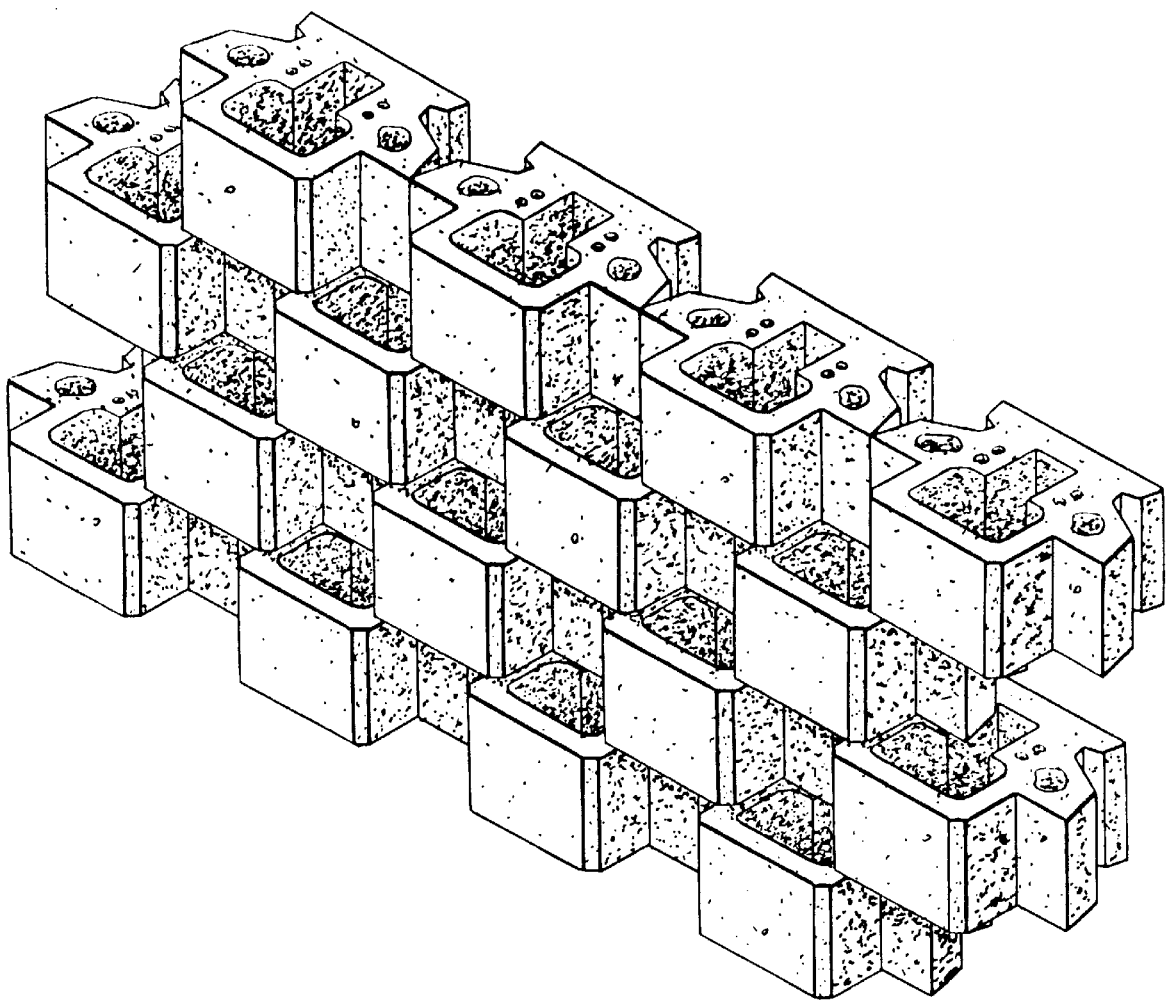
FIG. 6 is a perspective view of a portion of a retaining wall constructed with the retaining wall block of FIG. 1 with the block connection elements set at a second minimally setback position.
Figure 7:
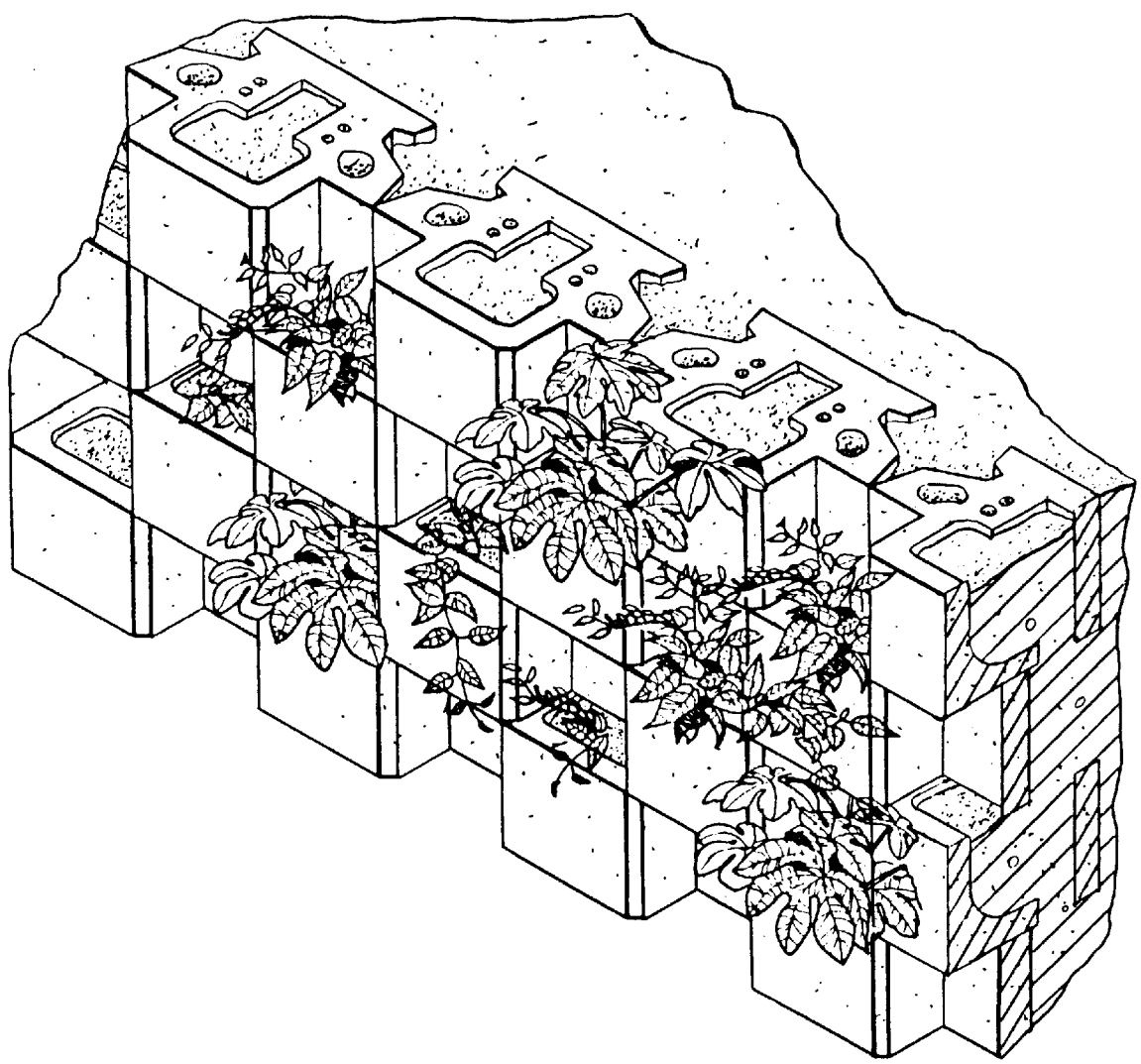
FIG. 7 is a perspective view of the retaining wall of FIG. 5 in use and with plants in the plant receiving cavities.
Figure 8:
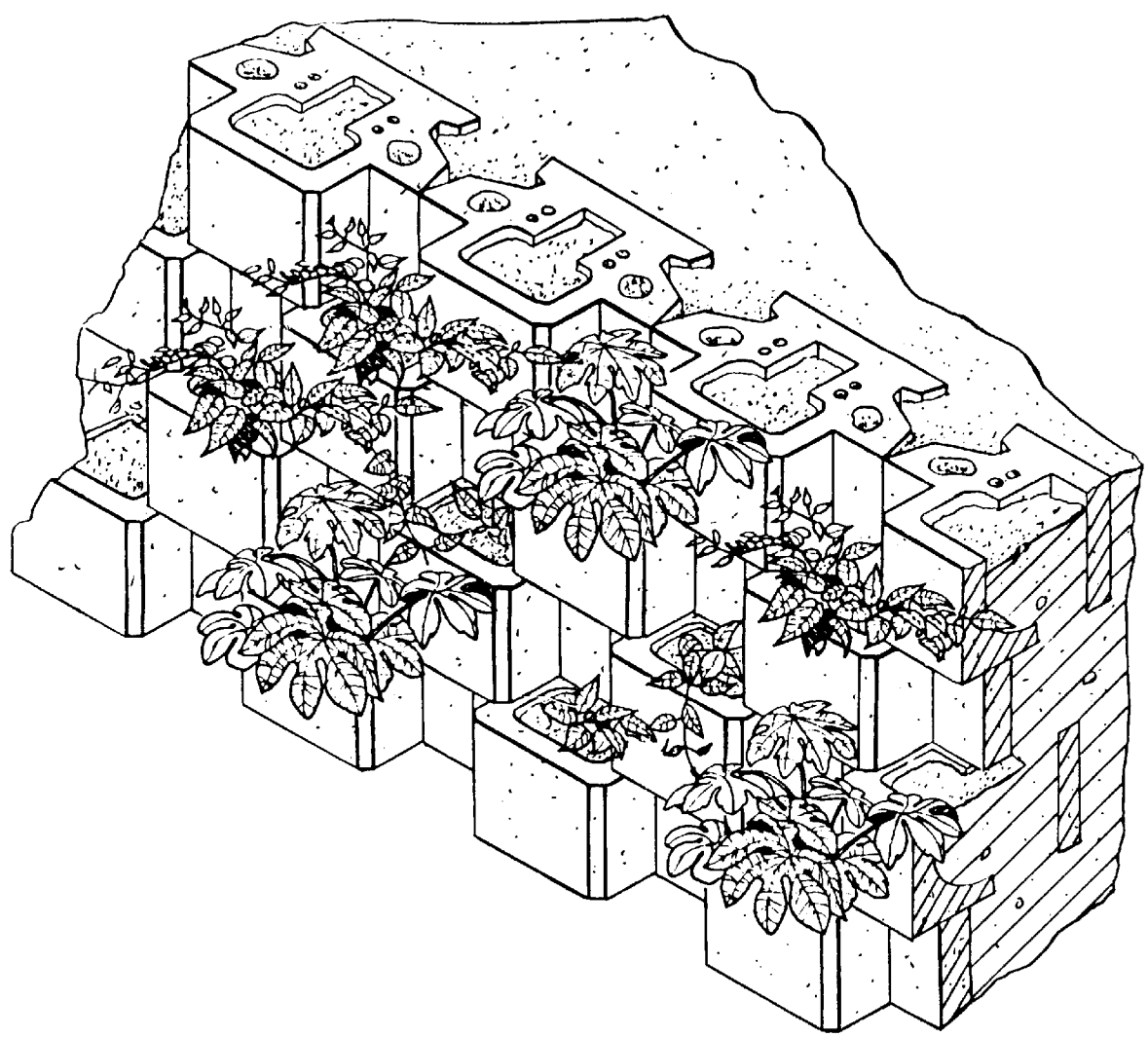
FIG. 8 is a perspective view of the retaining wall of FIG. 6 in use and with plants in the plant receiving cavities.

If a greater setback is desired the pins 44 are placed in rear pin holes 38. The same procedure is followed for placing the next layer of blocks. However, because the pins are placed more towards the rear of the underlying blocks the setback of additional courses is greater. A portion of a retaining wall constructed with pins in the rear pin hole is shown in FIG. 6. The retaining walls of FIGS. 5 and 6 are shown in use and with plants in the plant receiving cavities in FIGS. 7 and 8.

With the present pin connection system still further setback positions are possible. With the pins 44 placed in either front pin holes 36 or rear pin holes 38, the next course of blocks may be positioned even further back so that when slid forward the blocks contact the pins along second surfaces 26. Thus, the pin connection design allows four setback positions ranging from approximately zero degrees (i.e., vertical) to approximately 45 degrees. It will be appreciated that still further setback positions could be obtained by providing additional pin holes.

Figure 9A:
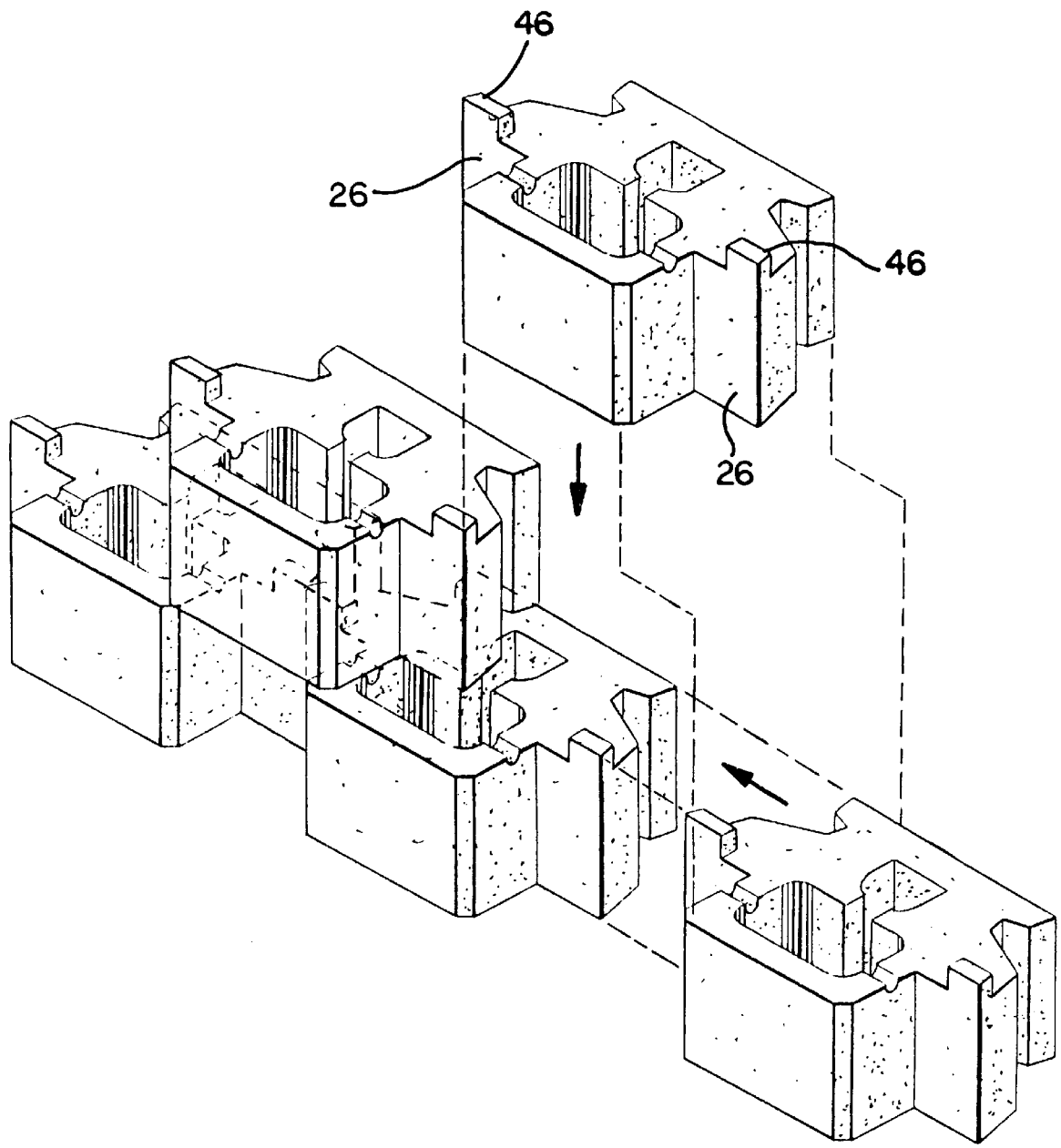
FIGS. 9a and 9b are a partially exploded view of a portion of a retaining wall and a sectional view of a retaining wall block with an alternative connection system.
Figure 9B:
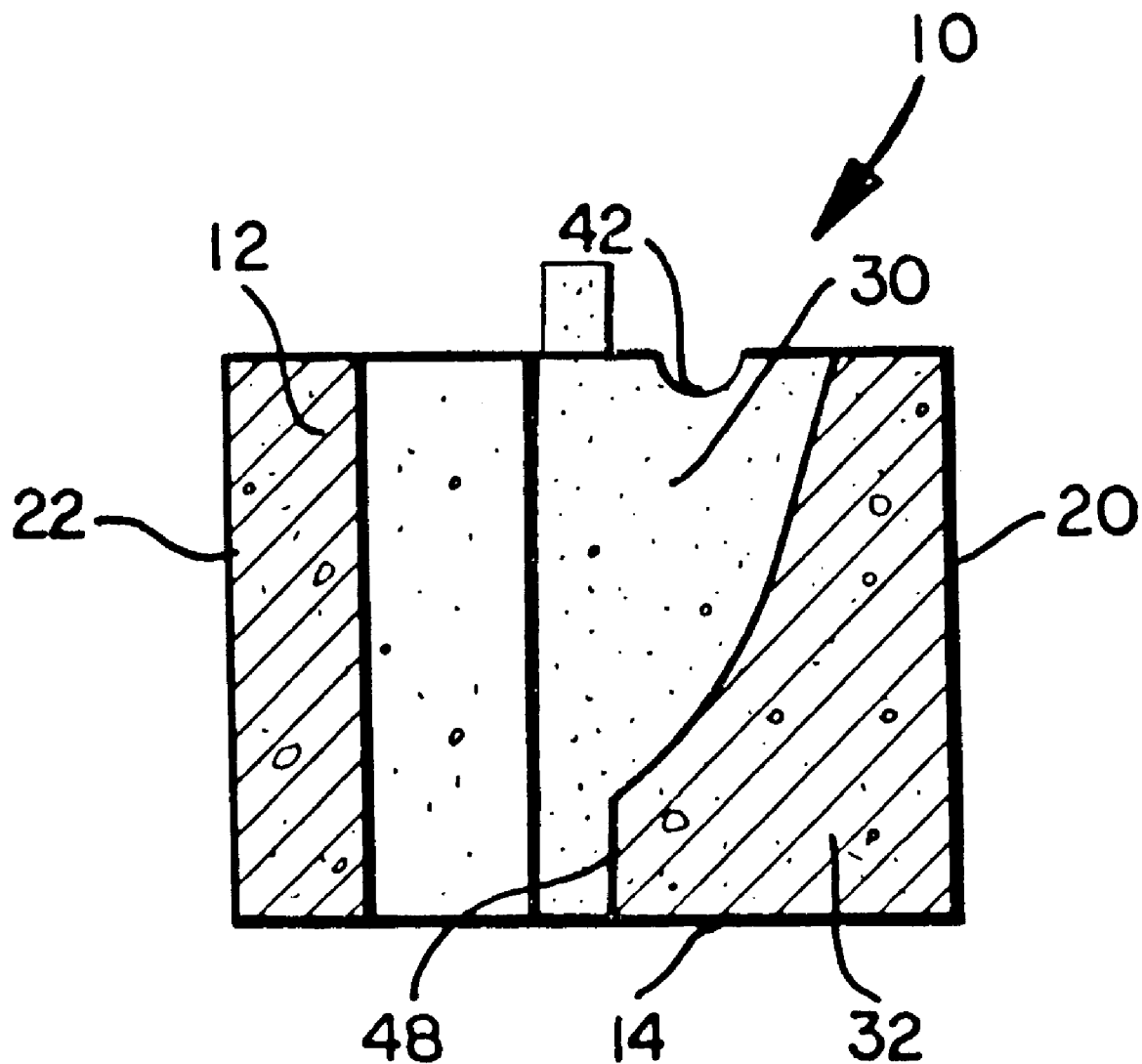

As an alternative to the pin hole connection system, other known means of connection may be utilized. One alternative connection system is shown in FIGS. 9a and 9b. In FIGS. 9a and 9b an upwardly extending knob 46 is located above the second surface of each side wall. Drainage cavity 34 is shaped to provide surfaces 48 generally parallel with the front face of the block. Once the initial layer of blocks is laid the next course above is laid so that the knobs 46 on adjacent blocks are received along the front edge of surfaces 48. Thus, the next course of blocks is stabilized due to the contact of surfaces 48 with knobs 46.

Figure 11:
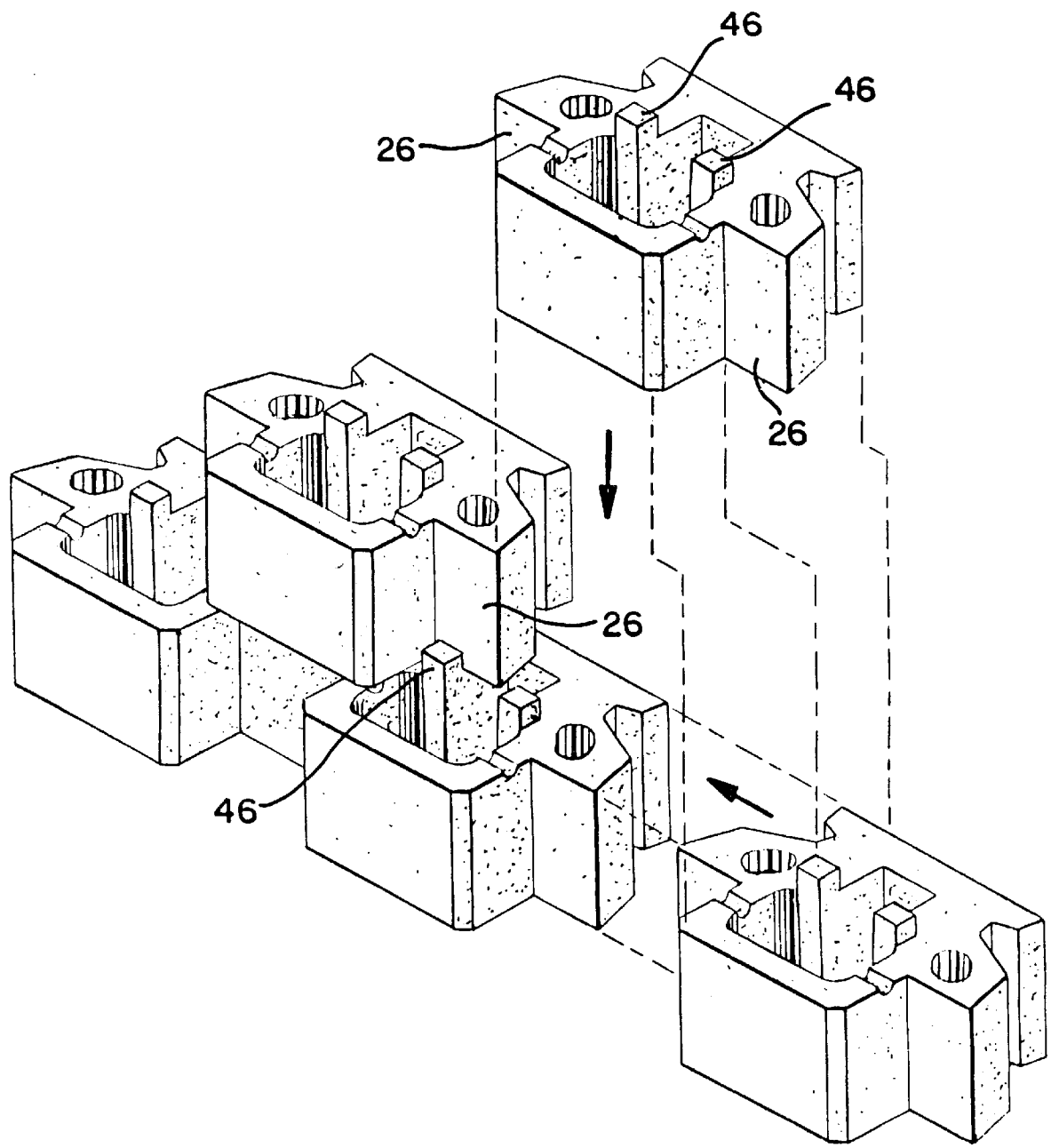
FIG. 11 is a partially exploded view of a portion of a retaining wall with a further alternative connection system.

A further alternative connection system is shown in FIG. 11. In the embodiment knobs 46 are located to the rear and inside of the plant-receiving cavity. The wall is constructed so that when the second and subsequent courses of blocks are laid, surfaces 26 are placed to the rear of knobs 46. Thus, each course is stabilized with respect to the next lower course and results in an extremely stable wall. With the knobs in this location the wall includes a slight setback from course to course.

Figure 10A:
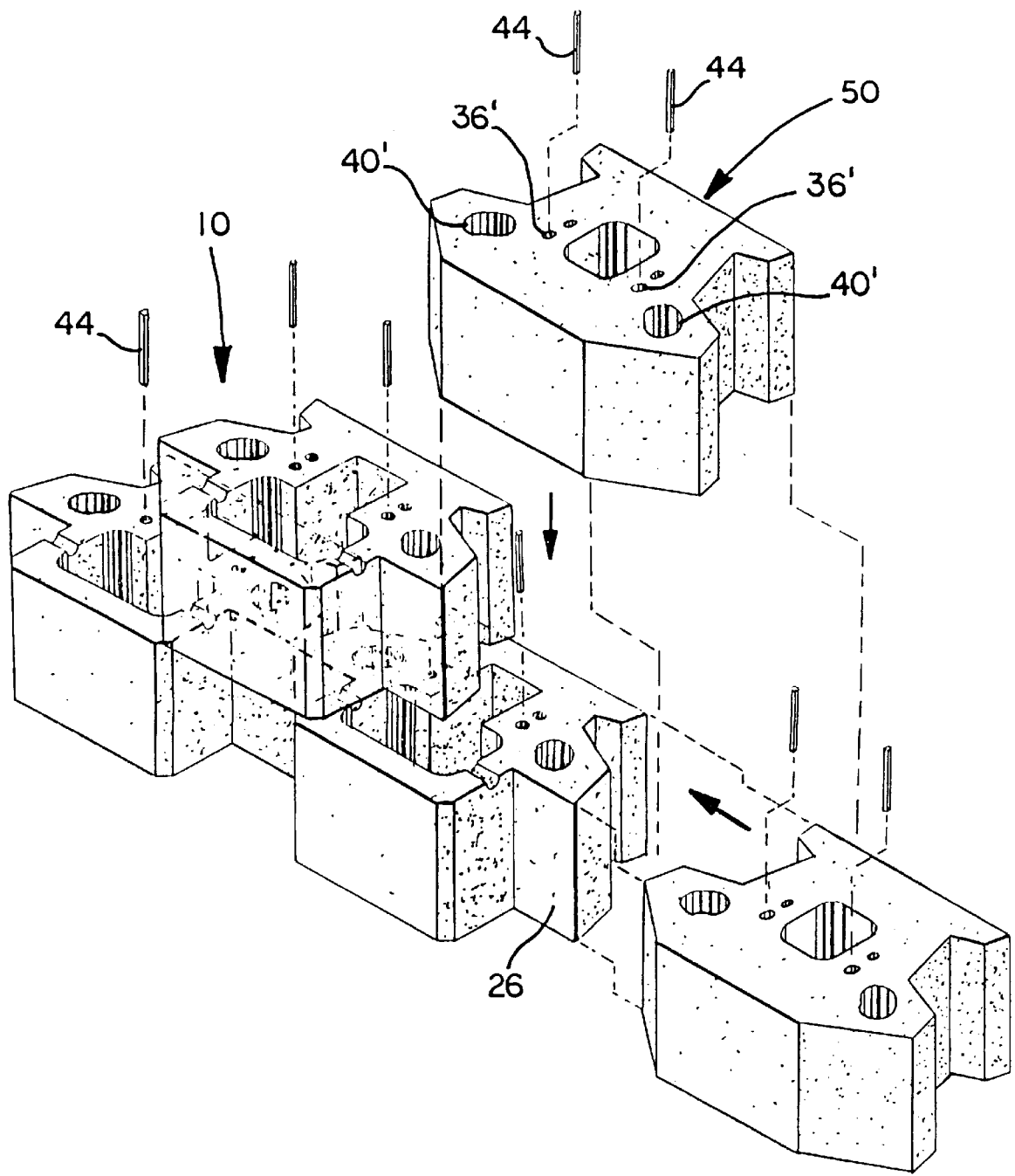
FIGS. 10a and 10b are a partially exploded view and a front view, respectively, of the wall block of the present invention used in the construction of a retaining wall with conventional non-plantable wall blocks.
Figure 10B:
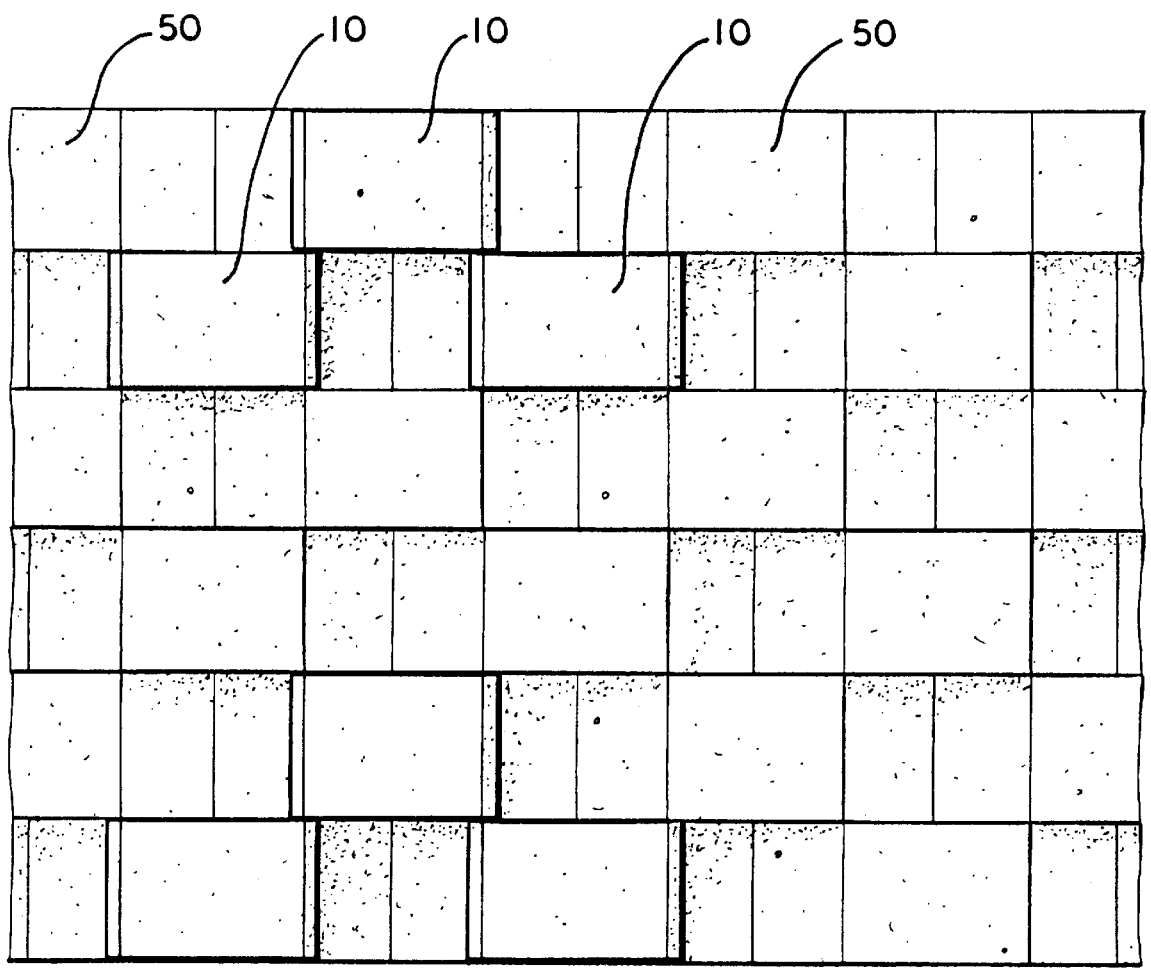

FIG. 10a and 10b illustrate the manner in which plantable wall blocks 10 of the present invention may be used in a retaining wall with other conventional non-plantable wall blocks. Wall blocks 10 have the pin hole connection system of FIGS. 1–4. Conventional wall blocks 50 have compatible pin hole connection systems such as that described in the '314 patent described above. Blocks 10 and 50 may be dispersed in a random pattern to construct the wall as in FIGS. 10a and 10b. Alternatively, blocks 50 comprise a first course of blocks of the retaining wall and blocks 10 may comprise the next course of blocks. With pins 44 in front pin holes 36' of blocks 50, the next layer of blocks 10 is laid in an offset manner with second surfaces 26 pushed up against pins 44. Should it be desired to provide a layer of conventional blocks on a layer of plantable blocks, pins 44 are placed in either front pin holes 36 or rear pin holes 38 (depending on the desired setback) of plantable blocks 10. Conventional blocks 50 are then laid in an offset manner so that pins 44 are received in the rear of pin pockets 40'.

A retaining wall constructed according to the present invention provides a desirable alternative to presently used plantable retaining walls. When the blocks are assembled to form a wall, the second surfaces of the side walls of adjacent blocks abut to form a generally planar indented surface. The indented surfaces lie above the plantable cavities in the next lower course of block. The plantable cavity is sufficiently exposed to allow plants and other vegetation to be planted and to thrive. This unique design allows the wall to be planted vertically or at other chosen setbacks and yet to retain the strength necessary to adequately serve as a retaining wall.

From the foregoing detailed description of specific embodiments of the invention, it should be apparent that a unique plantable retaining wall block and retaining wall made therefrom have been disclosed. Although particular embodiments of the invention have been disclosed herein in detail, this has been done for the purpose of illustration only, and is not intended to be limiting with respect to the scope of the appended claims, which follow. In particular, it is contemplated by the inventors that various substitutions, alterations and modifications may be made to the embodiments of the invention without departing from the spirit and scope of the invention as defined by the claims. For instance, the choice of materials or variations in the shape or angles at which some of the surfaces intersect are believed to be a matter of routine for a person of ordinary skill in the art with knowledge of the embodiments disclosed herein.

I claim:

1. A retaining wall block comprising:

top and bottom surfaces, each having a front edge and a rear edge, each being spaced apart from and substantially parallel to the other;

a front face extending between the front edges of the top and bottom surfaces and having a pair of side edges;

a rear face extending between the rear edges of the top and bottom surfaces and having a pair of side edges;

a pair of side walls extending between the top and bottom surfaces, one of the side walls extending between one of the side edges of the front and rear faces, the other of the side walls extending between the other of the side edges of the front and rear faces, each side wall having first, second and third surfaces, the first surface of each side wall extending from a side edge of the front face towards the rear face to the second surface, the second surface of each side wall extending away from the other side wall to the third surface, the second surface being generally parallel with the front face and perpendicular to the first surface, the third surface of each side wall extending from the second surface to the rear face such that the third surfaces converge towards the rear face; and a plant receiving cavity formed in the top surface, the cavity having a bottom wall which extends from the front face toward the rear face and terminates before the rear face to provide a drainage outlet positioned in the bottom wall adjacent to the rear face.

2. A retaining wall block according to claim 1 wherein the third surface of each side wall comprises two or more generally planar surfaces.

3. A retaining wall block according to claim 1 wherein the third surface of each side wall lies generally within a single plane.

4. A retaining wall block according to claim 1 wherein the bottom wall is tapered downward as it extends from the front face toward the rear face.

5. A retaining wall block according to claim 1 wherein the plant receiving cavity is positioned such that a substantial portion of the cavity lies substantially between the first surfaces of each side wall.

6. A retaining wall block according to claim 5 wherein the length of the front face along a front edge is greater than the sum of the lengths of the second surfaces of each side wall and wherein the sum of the lengths of the front face and the second surfaces of each side wall is equal to the length of the widest distance between the side walls as measured along a line substantially parallel to the front face.

7. A retaining wall block according to claim 5 wherein the sum of the lengths of the second surfaces of each side wall is greater than the width of the plant receiving cavity as measured along a line substantially parallel to the front face.

8. A retaining wall block according to claim 6 wherein the sum of the lengths of the second surfaces of each side wall is greater than the width of the plant receiving cavity as measured along a line substantially parallel to the front face.

9. A retaining wall block according to claim 1 further comprising a connection member to allow the block to be connected to blocks in adjacent rows.

10. A retaining wall block according to claim 9 wherein the connection member includes at least two pins, at least two pin holes for retaining the pins and at least two pin receiving pockets for receiving pins from adjacent blocks.

11. A retaining wall block according to claim 9 wherein the connection member is configured to allow for multiple set back positions to allow selection of multiple set backs when forming a retaining wall.

12. A retaining wall block according to claim 1 further comprising an alignment member to allow the block to be aligned with blocks in adjacent rows of a retaining wall.

13. A retaining wall block according to claim 12 wherein the alignment member is configured to allow for multiple set back positions to allow selection of multiple set backs when forming a retaining wall.

14. A retaining wall block according to claim 9 wherein the connection member is positioned such that the block may be aligned with approximately no setback with respect to blocks in adjacent rows of a retaining wall.

15. A retaining wall block according to claim 12 wherein the alignment member is positioned such that the block may be aligned with approximately no setback with respect to blocks in adjacent rows of a retaining wall.

* * * * *